United States Patent

[11] 3,545,509

| [72] | Inventor | Joseph Baxter, Jr.<br>Franklin, Ohio |
| --- | --- | --- |
| [21] | Appl. No. | 859,905 |
| [22] | Filed | Sept. 22, 1969<br>Division of Ser. No. 812,564,<br>May 13, 1966, abandoned |
| [45] | Patented | Dec. 8, 1970 |
| [73] | Assignee | The Black Clawson Company<br>Hamilton, Ohio<br>a corporation of Ohio |

[54] TREE HARVESTER
21 Claims, 16 Drawing Figs.

[52] U.S. Cl. ................................................. 144/309,
143/32, 144/2, 144/3, 144/208
[51] Int. Cl. ................................................. A01g 23/02
[50] Field of Search ........................................... 144/2(21),
3(4), 34, 208(3.5), 304(34); 143/43(34), 32(34)

[56] References Cited
UNITED STATES PATENTS

| 3,030,986 | 4/1962 | Longert | 144/2 |
| --- | --- | --- | --- |
| 3,181,578 | 5/1965 | Longert | 144/2 |
| 3,356,116 | 12/1967 | Brundell et al. | 144/309 |

*Primary Examiner*—Gerald A. Dost
*Attorney*—Marechal, Biebel, French and Bugg

ABSTRACT: Standing trees are converted directly into chips by progressively delimbing the tree from the bottom to the top, topping the tree, progressively debarking the tree trunk from the top towards the bottom followed by progressively converting the tree trunk into chips from the top toward the bottom. Endless chains are employed for the delimbing, chipping and debarking operations, and the chipping chain employs knives which cut the trunk in such a manner to produce chips having long fibers and to direct the chips upwardly out of the path of the knives.

INVENTOR.
JOSEPH BAXTER, JR.

BY
Marechal, Biebel, French & Bugg
ATTORNEYS

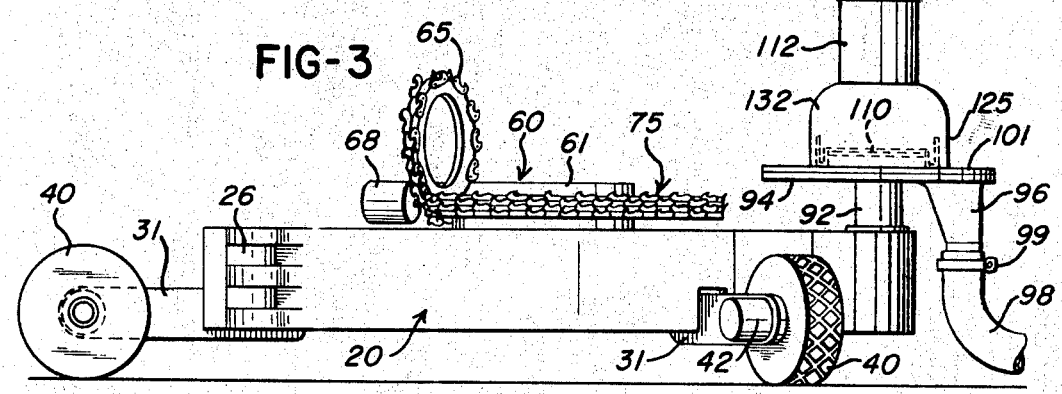
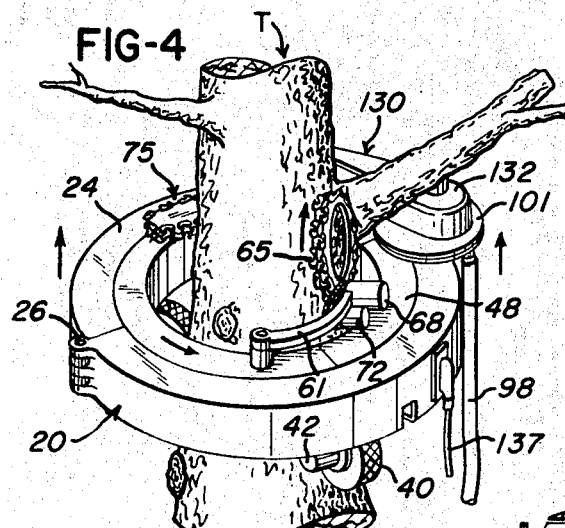
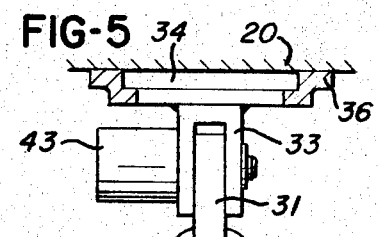
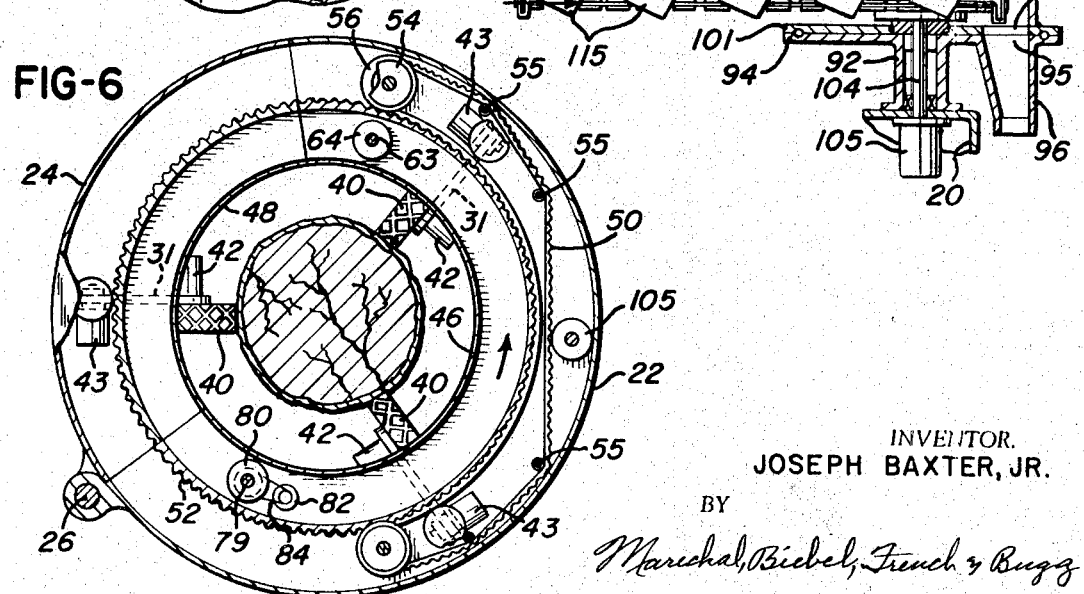

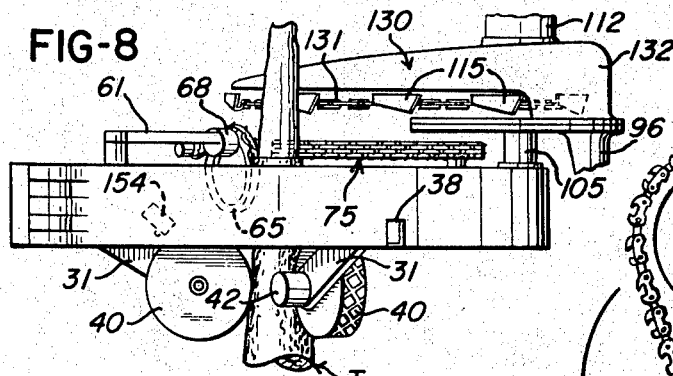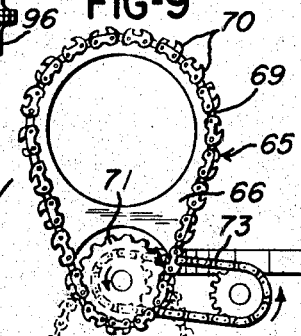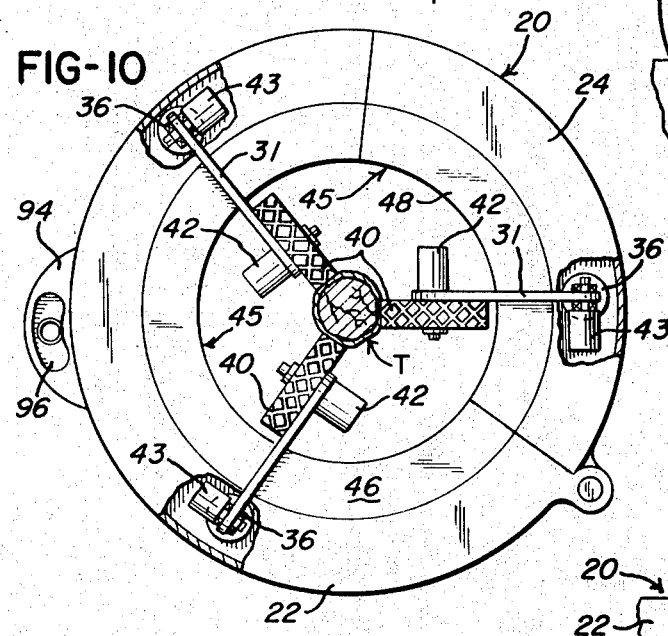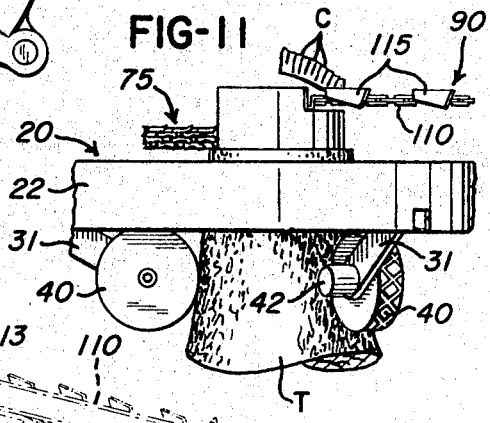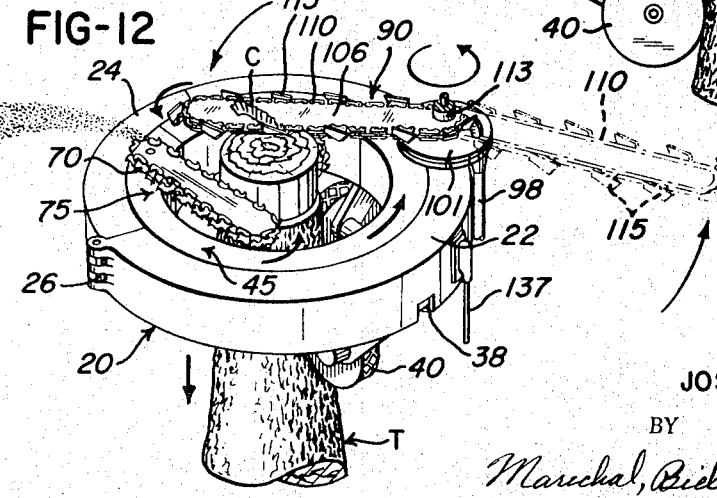

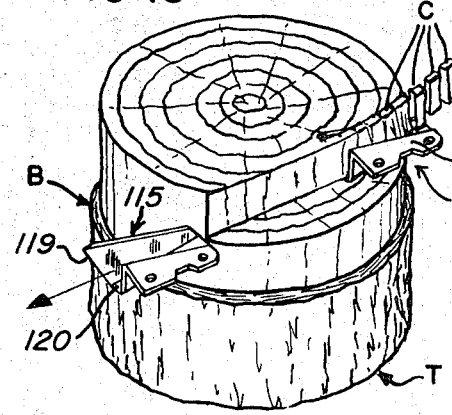
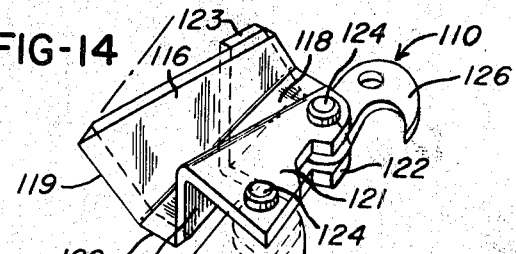
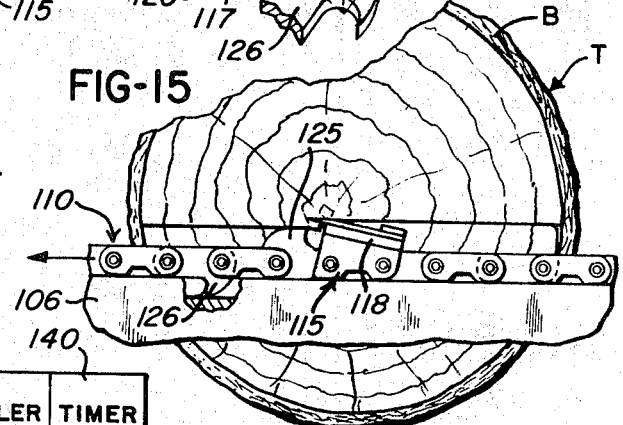
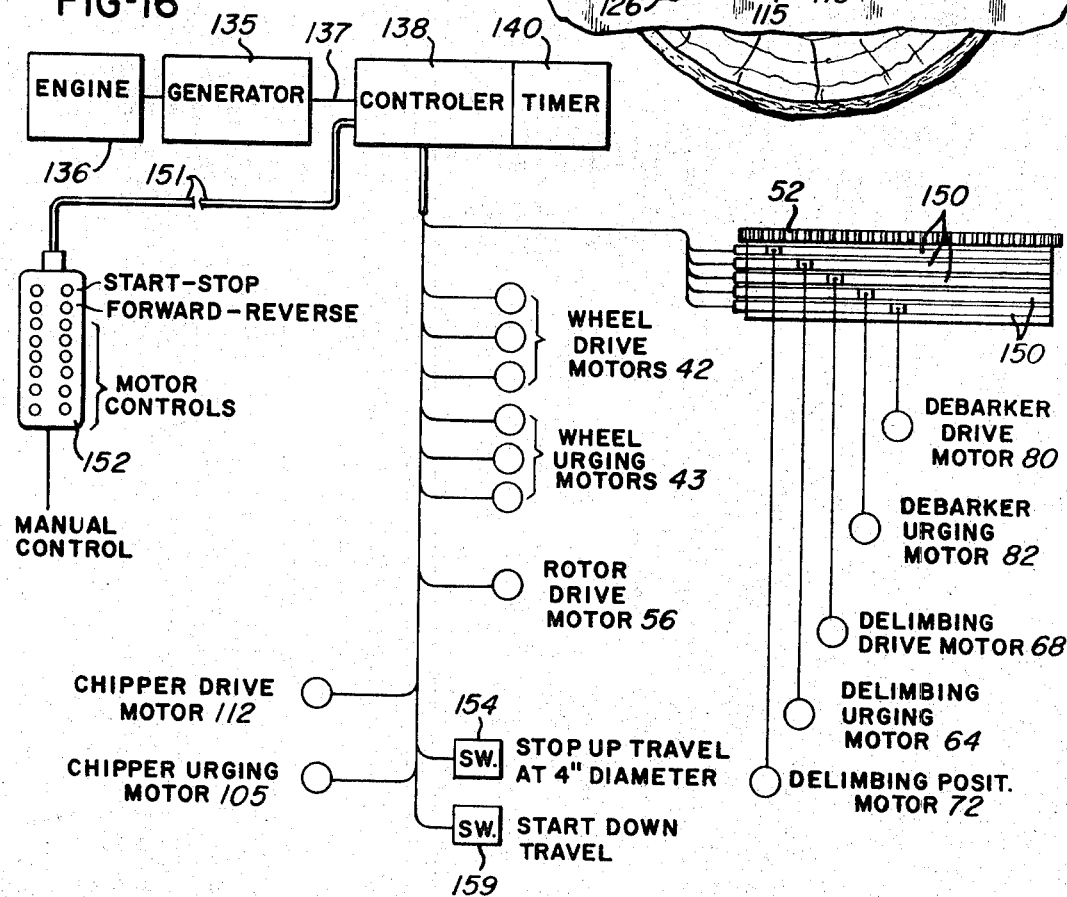

TREE HARVESTER

RELATED APPLICATIONS

This application is a division of application Serial No. 812,564, filed March 28, 1969, now abandoned which is a continuation of application Serial No. 549,924, filed May 13, 1966, now abandoned.

This invention relates to the harvesting of trees, and more particularly, to a compact mobile apparatus adapted to convert a standing tree directly into clean wood chips and thereby substantially reduces the time, labor, and equipment requirements for producing chips for use in the manufacture of paper, wood pulp, chipboard and other products requiring subdivided wood particles.

The common procedure for converting a tree into small chips for paper making is to fell and delimb the tree and then to saw the tree into logs which are transported to a processing plant where the logs are fed through a barker and a chipper. The apparatus of the present invention is directed to the conversion of a tree directly into chips without felling the tree so that not only is the felling operation eliminated, but so are the operations of delimbing the felled tree, sawing the tree into logs and transporting the logs to the debarking and chipping equipment. As a result, substantial economies are provided by eliminating the investment in conventional log sawing, loading, transporting and unloading equipment and in the expense of operating and maintaining this equipment. Furthermore, when a tree is debarked while standing, the bark can be left in the forest as granulated mulch, and when the standing tree trunk is converted directly into chips, good wood is not wasted in the form of sawdust as occurs when a tree trunk is sawed into logs.

Accordingly, it is a primary object of the present invention to provide novel apparatus for converting a standing tree directly into clean wood chips which can be used in the making of paper and other products.

Another object is to provide a mobile apparatus which can be moved from tree to tree and is adapted to climb a tree while delimbing the tree on its way up, top out the tree, and then progressively debark and convert the tree trunk into chips on its way down.

As another object, the present invention provides apparatus which is adapted to be used solely for delimbing, or for only delimbing and debarking or for delimbing and debarking in conjunction with topping and converting the tree trunk into chips.

A further object of the invention is to provide apparatus as outlined above which is adapted to be operated automatically so that the delimbing, debarking, topping and chipping operations are performed in predetermined sequence, and the tree trunk is converted into chips within a minimum period of time and with minimum labor expense.

Still another object of the invention is to provide apparatus as outlined above wherein the debarking operation is adapted to distribute the bark in the form of granulated mulch uniformly over the ground surrounding the tree, and the chips formed by the chipping operation are directed downwardly within a duct to a receiver such as a wagon or the like.

Another object of the invention is to provide apparatus as outlined above including knives for the chipping operation whereby the tree trunk is converted into chips having the grain extending the length of the chips for producing chips having long fibers while minimizing the power required for forming the chips.

Still a further object of the invention is to provide a novel method for converting a standing tree directly into clean wood chips.

Other objects and advantages of the invention will be apparent from the following description, the accompanying drawings and the appended claims.

In the drawings:

FIG. 3 is an elevational view of the apparatus showing the position of the support wheels after the apparatus has converted a tree trunk into chips;

FIG. 4 is a perspective view of the apparatus showing the delimbing operation while climbing a tree;

FIG. 5 is a fragmentary view of the upper end portion of a wheel support arm;

FIG. 6 is a plan view of the apparatus with the top portion broken away to show internal drive components;

FIG. 7 is a fragmentary view of the chipping mechanism shown in part axial section;

FIG. 8 is an elevational view of the apparatus after it has reached the top portion of the tree and illustrating the initial debarking and topping off operation;

FIG. 9 is an elevational view of the delimbing saw showing its positions during and after the delimbing operation;

FIG. 10 is a bottom view of the apparatus with a portion broken away to show schematically the mounting of the wheel support arms;

FIG. 11 is a fragmentary elevational view of the apparatus illustrating the simultaneously performed debarking and chipping operations;

FIG. 12 is a perspective view of the apparatus with the chip receiving hood removed to show the debarking and chipping operations;

FIG. 13 is a perspective view of a tree trunk showing the path and the relative position of the chipping knives for converting the debarked tree trunk into chips;

FIG. 14 is a perspective view of a typical chipping knife and showing its mounting on the drive chain;

FIG. 15 is a plan view of a tree trunk showing the passing of a chipping knife through the central portion of the tree; and FIG. 16 is a schematic wiring diagram illustrating a semiautomatic control system for operating the apparatus.

Figure 1:
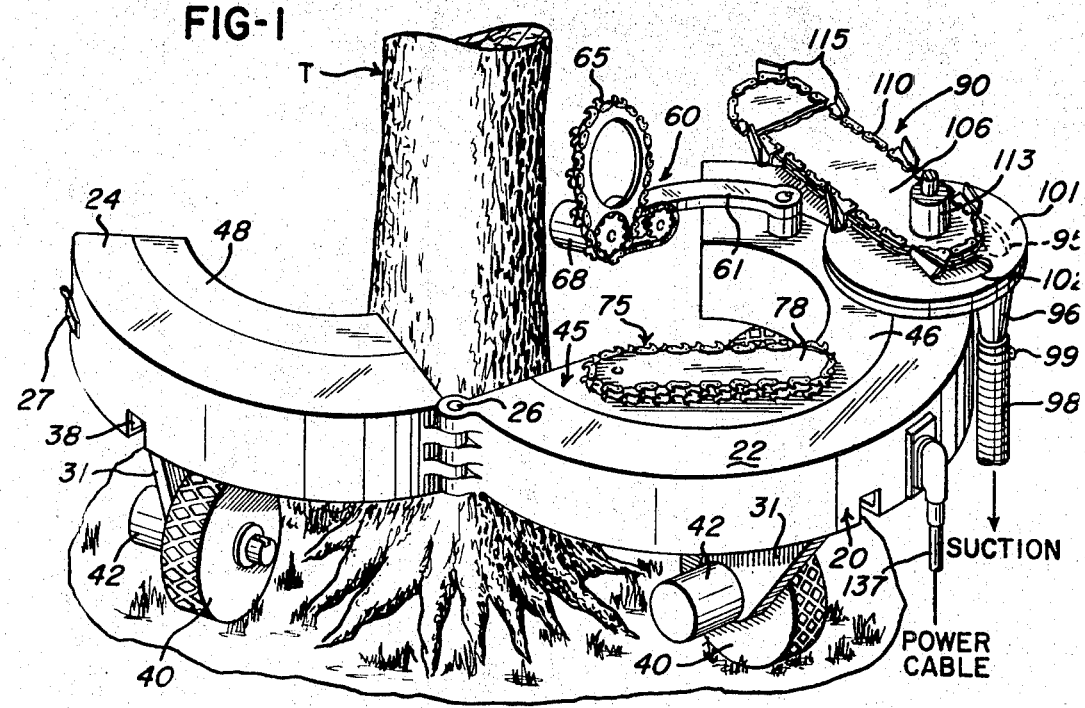
FIG. 1 is a perspective view showing apparatus constructed in accordance with the invention with a portion of the chipping mechanism removed.
Figure 2:
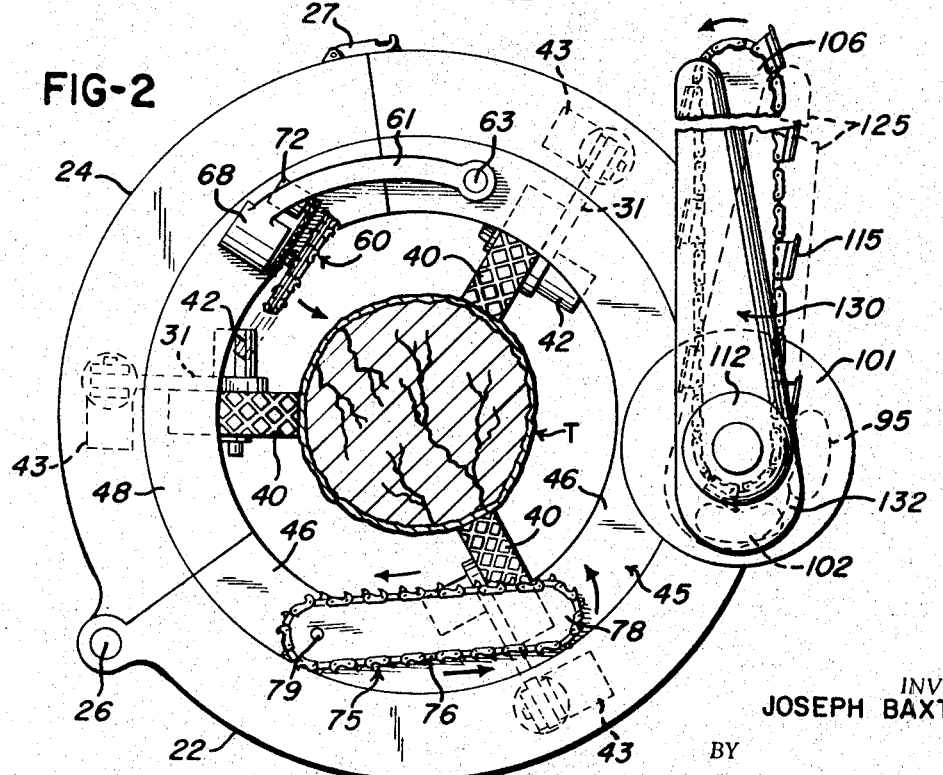
FIG. 2 is a plan view of the apparatus of FIG. 1 showing the apparatus in surrounding relationship with a tree trunk.

Referring to the drawings, which illustrate a preferred embodiment of apparatus constructed in accordance with the invention, the major components and their assembled relationship are shown in FIGS. 1 and 2. Basically the apparatus includes a hollow annular frame 20 having a channel-shaped cross-sectional configuration and formed in two arcuate sections 22 and 24 which are hinged together at 26 and locked together by a toggle latch 27.

Three uniformly spaced wheel support mechanisms 30 are mounted on the frame 20 and each mechanism includes an arm 31 pivotally connected to a U-shaped member 33 (FIG. 5) which is rotatably mounted on the frame 20 by a circular plate 34 received within an annular bearing member 36 secured to the frame. The arms 31 extend through corresponding radially extending slots 38 formed within the lower portion of the frame 20 and support corresponding wheels 40 including pneumatic tires. Each wheel is driven by a reversible electric motor and gear reduction combined as a unit 42. A similar drive unit 43 including a stall-type motor is mounted on each member 33 for pivoting the corresponding arm 31 from an outwardly extending position (FIG. 3) to an inwardly extending position (FIG. 8).

A rotor 45 is rotatably supported within the frame 20 by suitable tracks and bearings (not shown) and is also formed in two arcuate sections 46 and 48 corresponding in angular extent to the frame sections 22 and 24 respectively. The smaller section 24 of the frame 20 is supported by one of the wheel support mechanisms 30 so that it may be moved away from the frame section 22 to carry with it the corresponding section 48 of the rotor 45 so that the apparatus can be moved into a position for receiving a tree trunk T as shown in FIG. 1.

Referring to FIG. 6, the annular rotor 45 is rotated within the frame 20 by an endless cog belt 50 having teeth engaging a circumferential portion of a sprocket 52 mounted on the rotor 45. The belt 50 is directed around a pair of sheaves 54 and a series of guide rollers 55 mounted within the frame 20, and an urging or stall-type motor 56 is mounted within the frame section 22 under the leading sheave 54 for driving the belt 50.

A delimbing mechanism 60 is carried by the rotor 45 and includes an arm 61 pivotally supported by a shaft 63 extending vertically from a gear reduction unit 64 (FIG. 6) mounted within the rotor 45. Preferably, the unit 64 is driven by a stall-type motor or through a slip clutch to provide an urging torque on the shaft 63. A delimbing chain saw 65 (FIGS. 1 and 9) is mounted on the outer end of the arm 61 and includes an open guide plate 66 projecting vertically from the end of a horizontally positioned drive motor 68. An endless chain 69 having cutting teeth 70 is directed around the guide plate 66 and is driven by a sprocket 71 connected to the drive motor 68. As shown in FIGS. 2 and 9, a small motor and gear reduction unit 72 is also mounted on the end of the arm 61 adjacent the drive motor 68 and is connected by a chain drive 73 to the guide plate 66 for rotating the plate from an upwardly extending position to a downwardly extending position as shown by the dotted lines in FIG. 9.

Also carried by the rotor 45 is a debarking mechanism 75 which includes an endless chain 76 directed around a horizontally extending guide plate 78. The chain 76 is driven in a counterclockwise direction (FIG. 2) around the guide plate by a sprocket (not shown) mounted on a shaft 79 extending from a motor 80 (FIG. 6) mounted within the rotor 45. The guide plate 78 is rotated on the vertical axis of the shaft 79 by an urging or stall-type motor 82 (FIG. 6) similar to the unit 64 for the delimbing saw and connected to the guide plate 78 by a chain drive 84. The debarking chain 75 has teeth 85 which are hook-shaped in configuration and are arranged in a staggered relationship so that the teeth effectively abrade or rasp the bark from the tree.

A chipping mechanism 90 is mounted on the frame 20 and includes a housing 92 (FIG. 7) projecting upwardly from the frame 20. A circular horizontally positioned plate 94 is formed as part of the housing 92, and an arcuate opening 95 is formed within the plate 94. A spout 96 extends downwardly from the opening 95 and is connected to a flexible duct 98 (FIG. 3) by a clamp 99. Another circular plate 101 also having an arcuate shaped opening 102 (FIG. 2) is rotatably supported by the plate 94. Extending vertically through the housing 92 is a shaft 104 which connects at its lower end with a stall-type urging motor 105 mounted within the frame 20 and at its upper end with a horizontally positioned guide plate 106 (FIG. 1) supporting an endless chipping chain 110.

The chain 110 is driven by a motor 112 (FIG. 7) supported by a housing 113 mounted on top of the guide plate 106 (FIG. 1) and includes a series of uniformly spaced knives 115 projecting outwardly from the chain. Each knife is preferably formed from sheet metal and includes a wedge shaped outer wall 116 integrally connected to a parallel spaced inner wall 117 by a sloping bottom wall 118 thereby forming a generally triangular troughlike configuration. The leading edge portions of the walls 116 and 118 are ground or otherwise sharpened to provide cutting edges 119 and 120.

A flange portion 121 is formed as an integral part of each knife 115 and extends inwardly at 90° from the inner wall 117 to form an upper link member for the chain 110. A lower flange or link member 122 is disposed in parallel spaced relation under the flange 121 and includes an upwardly extending portion 123 rigidly secured to the trailing edge portion of the wall 116 to reinforce and add rigidity to the troughlike construction of the knife. The link members extending from each knife 115 are connected to adjacent link members within the chain 110 by suitable rivets 124 and are so constructed and arranged that the walls 116 and 117 taper inwardly towards the chain 110 from their corresponding leading edges while the bottom wall 118 slopes both upwardly and inwardly from its leading cutting edge 120. Thus the knife 115 forms generally a compound angle with the chain 110 with the upper leading portion of the cutting edge 119 being disposed the furthest from the path of travel of the chain 110.

Also provided in the chain 110 for each knife 115 is a link member 125 (FIG. 15) which projects outwardly directly in front of the corresponding knife 115 and provides a gauge for determining the depth of cut into the tree trunk by the cutting edge 119. The chain 110 is guided around the plate 106 by link members 126 (FIG. 15) which slide within a track or groove formed within the peripheral edge portion of the plate 106.

As shown in FIGS. 3 and 8, the plate 94 and chipping chain 110 are positioned above the horizontal plane of the debarking chain 76 and above the arm 61 supporting the delimbing mechanism 60 so that the chipping chain 110, support plate 101, housing 113 and motor 112 can be rotated as a unit by the motor 105 and through 360° without interfering with the delimbing and debarking mechanisms carried by the rotor 45 after the delimbing chain support plate 66 is rotated to its downwardly extending position adjacent the inner surface of the rotor 45.

An elongated tapered hood 130 (FIGS. 2 and 7) is mounted on the plate 101 of the chipping mechanism 90 and is rotatable through a few degrees relative to the subassembly comprising the motor 112, housing 113 and chipping chain guide plate 106. Normally, however, the hood 130 is spring biased to a position where the leading lower edge 131 (FIG. 8) is positioned directly above the chipping run of the knives 115 as shown in FIG. 2. The rear portion 132 of the hood 130 covers the opening 102 formed within the plate 101.

Referring to FIG. 15, preferably each of the drive and urging motors operates on a high frequency, as for example, 400 cycles per second, so that the size and weight of each motor is low for the horsepower produced. Electrical power for these motors may be supplied from a generator 135 driven by a turbine 136 which operates on a fuel such as kerosene. A powerline or cable 137 connects the generator to a controller 138 including a timer 140 and mounted within the frame 20.

The wheel drive motors 42, chipping drive motor 112 and stall-type urging motors 43, 56 and 105 for urging the wheel support arms 31, rotor 45 and chipping mechanism 90, respectively, are connected directly to the controller 138. On the other hand, the drive motors 68 and 80 for the delimbing and debarking mechanisms 60 and 75 respectively and the corresponding stall-type urging motors 64 and 82 along with the positioning motor 72 are connected to the controller 138 through a series of corresponding slip rings 150 formed within the periphery of the rotor sections 46 and 48. Also connected to the controller 138 by a cable 151 is a manual control box 152 which enables an operator to control the wheel drive motors 42 and other motors from a remote position.

In operation, the tree harvesting apparatus of the invention can be moved across the ground by positioning the wheel support arms 31 vertically with the motors 43 and releasing each arm for free rotation on a vertical axis so that the wheels 40 can float like a caster wheel in generally parallel alignment. The wheel drive motors 42 are then energized from the control box 152, and the apparatus is manually guided in the desired direction. When the apparatus approaches a tree, the corresponding sections of the frame and rotor are aligned and the latch 27 securing the two frame sections 22 and 24 is released so that the smaller frame section 24 may be opened carrying with it the corresponding section 48 of the rotor 45. The apparatus is then positioned around the base portion of the tree (FIG. 1), and the two sections of the frame are recoupled so that the frame surrounds the tree trunk as shown in FIG. 2.

The supporting wheels 40 are returned to a radial aligned position, and the rotary support for each arm 31 is locked, after which the arms 31 are urged inwardly by energizing the motor 43 so that the inflatable tires engage the back surface of the tree trunk. With the energizing of the urging motors 43 for the wheel support arms 31, the controller 138 is energized and, in turn, energizes the wheel drive motors 42, rotor drive motor 56, and delimbing urging motor 64 and delimbing drive motor 68.

The apparatus then begins climbing the tree due to the positive friction engagement of the soft rubber tires and the bark B on the tree trunk T. While the apparatus is climbing the tree, the upwardly extending delimbing mechanism 60 progressively removes the limbs by sawing through each limb close to the tree trunk T. The drive motor 56 for the rotor 45 (FIG. 5) urges the chain saw into a limb but the motor 56 will stall when the torque reaches a predetermined limit. This assures that the delimbing chain saw 65 will not be overloaded while carrying the saw around the tree to assure that all of the limbs are removed. The opening within the guide plate 66 of the delimbing mechanism prevents the plate from binding within a limb as the mechanism is carried in a circular path by the rotor 45.

When the apparatus reaches the top portion of the tree and the wheel support arms 31 reach a predetermined inner limit, one of the support arms actuates a switch 154 (FIG. 15) which stops the wheel drive motors 42 and actuates the timer 140. The timer deenergizes the delimbing saw drive motor 68 and urging motor 64 and energizes the positioning motor 72 for a period sufficient to rotate the guide plate 66 to a downwardly extending position (FIG 9) between the tree trunk T and the rotor 45. The urging motor 64 is then reversed to hold the chain saw 65 adjacent the rotor 45. The timer then energizes the urging motor 82 and drive motor 80 for the debarking mechanism 75 causing a ring of bark to be removed from the tree. For purposes of illustration, a ring having a width of approximately 1¾ inch may be removed.

The wheel drive motors 42 are reversed by the timer 140 and are energized momentarily to lower the apparatus down the tree by approximately 1½ inch or slightly less than the width of the removed bank of bark. Another band of bark is removed, and the apparatus is lowered by again another increment. After several bands of bark are removed, the chipping mechanism drive motor 112 and urging motor 105 are energized by the timer 140, causing the chipping knives 115 to begin topping off the tree. Preferably, the topping operation is performed at small tree diameter, as for example, at a tree diameter of approximately 4 inches. During the topping off operation, the hood 130 engages the top portion of the tree and is held against a spring bias (not shown) from rotating with the chipping chain guide plate 106 (FIG. 2), until the tree is topped off, after which the hood returns to its normal position covering the return run of the chipping knives 115.

After the chipping mechanism has topped off the tree, the chipping chain support plate, motor 112, and hood 130 continue to rotate counterclockwise (FIG. 12) through an arc of 360°. This rotation of the chipping mechanism actuates a switch 159 (FIG. 15) which causes the controller 138 to actuate or pulse the wheel drive motors 42 again and thus to lower the apparatus by another increment where the debarking mechanism removes another successive band of bark and the chipping mechanism forms another layer of the tree trunk into chips. The bark removed from the tree is distributed in small pieces uniformly over the ground surrounding the base of the tree as the debarking mechanism 75 revolves around the tree with the rotor 45.

Referring to FIGS. 13 and 14, the cutting edge 119 of each chipping knife 115 lies substantially within a vertical plane and thus passes through the tree trunk parallel to the grain for effectively splitting the tree trunk to form the chips C. This is desirable to minimize the power required to drive the chipping chain 110 and also to form chips having long fibers running the length of each chip.

As the bottoms of the chips are sheared from the tree trunk by the bottom cutting edges 120 of the chipping knives, a band of chips is forced up the sloping bottom wall 118 of each knife out of the path of travel of the knives causing the band to split laterally in the form of loosely connected pin chips. These pin chips are sucked upwardly (FIG. 11) into the hood 130 and downwardly through the aligned openings 95 and 102 formed within the corresponding plates 94 and 101 and through the duct 98 by a suction blower (not shown) which is connected to the lower end of the duct. The blower also serves to convey the chips to a suitable conveying means such as a wagon or a pipe line.

The apparatus continues to travel down the tree trunk in step-by-step increments while successively removing rings of bark and simultaneously forming layers of the trunk directly into chips until the wheels 40 engage the ground. The arms 31 supporting the wheels are then moved outwardly to the position shown in FIG. 3, causing the frame to be moved downwardly close to the ground. In this manner, the chipping mechanism 90 can be moved as close to the ground as possible and thereby minimizes the height of the remaining stump. The inwardly urging force exerted by the wheels against the trunk prevents counter rotation of the frame 20 while the apparatus is ascending and descending the tree. As the wheels move to the position of FIG. 3, however, counterrotation of the frame is prevented by the ground engagement of the wheels and the increasing moment arm provided by the arms 31 moving outwardly.

From the drawings and the above description, it can be seen that a tree harvesting apparatus constructed in accordance with the invention provides many desirable features and advantages. Basically, by performing the operations of delimbing, topping, debarking and chipping with a single apparatus and without felling the tree, the investment in equipment for converting a tree into chips is substantially reduced along with the expense of maintaining and operating the equipment. Furthermore, by converting the standing tree trunk directly into clean chips and by providing semiautomatic operation of the apparatus, it has been determined that the apparatus provides a significant reduction in labor cost for converting a tree into chips.

Another important advantage provided by the apparatus of the invention is that the bark removed from the tree by the debarking mechanism 75 carried by the rotor 45 is uniformly distributed onto the ground in the form of granulated mulch. It is to be understood, however, that the bark could be collected and used for other purposes, if desired. Furthermore, since the tree trunk is not cut into logs, there is no loss of the wood forming the trunk in the form of sawdust. Instead, substantially the entire tree trunk is converted into chips which can be conveniently transported in less space than commonly required for transporting logs.

It is also a feature of the invention that the chips formed by the chipping mechanism 90 are primarily split from the tree trunk by the chipping knives 115 so that minimum power is required from the motor 112 for driving the chipping chain 110. The form of the chips produced by the knives is also desirable in that the chips are provided with long fibers which produce a paper having a high tear strength.

The support of the delimbing mechanism 60 by the arm 61 which is urged inwardly by the motor 64 also provides the advantage that each limb will be cut off adjacent the tree trunk so that the wheels 40 can easily pass over the small limb stubs. Furthermore, the support of the wheels 40 by the corresponding arms 31 enables the apparatus to accommodate trees of various size and especially relatively large diameter trees, as for example, trees having a diameter of 30 inches or larger. The movement of the wheel support arms 31 further enables the apparatus to be lowered adjacent the ground so that the height of the remaining tree stump is minimized.

While the form of apparatus herein described constitutes a preferred embodiment of the invention, it is to be understood that the invention is not limited to this precise form of apparatus, and that changes may be made therein without departing from the scope of the invention.

I claim:

1. Apparatus for converting the trunk of a standing tree directly into small chips, comprising a frame adapted to receive the base portion of a tree adjacent the ground, tree climbing means mounted on said frame for moving said frame up to the top portion of the tree trunk and back down the tree, means carried by said frame for progressively delimbing the tree as said frame climbs the tree, means carried by said frame for progressively debarking the tree trunk as the frame progresses along the tree trunk, means carried by said frame for topping the tree trunk at a predetermined elevation and for progressively converting the tree trunk into chips after the bark is removed as the frame progresses down the tree, means for collecting the chips as they are formed by said chipping means, and control means for operating said climbing means, delimbing means, debarking means, topping and converting means in accordance with a predetermined sequence.

2. Apparatus as defined in claim 1 wherein said tree climbing means includes a plurality of angularly spaced wheels, means for driving each said wheel, means for movably supporting each said wheel to accommodate tree trunks of different diameters, and means for urging each said wheel inwardly towards the tree to provide positive engagement of the wheels against the tree surface while said frame travels up and down the tree.

3. Apparatus as defined in claim 2 wherein said means for movably supporting each said wheel includes an arm, means for pivotally mounting each said arm on said frame, and means for positioning said wheels in generally parallel alignment for moving said apparatus on the ground.

4. Apparatus as defined in claim 1 wherein said frame is annular in configuration and includes relatively movable sections adapted to open for enabling said frame to receive the base portion of the tree within the center opening.

5. Apparatus as defined in claim 4 wherein said frame includes an annular rotor enclosed within said frame, means mounting said delimbing means and said debarking means on said rotor, means mounting said climbing means on said frame, and means for rotating said rotor to revolve said delimbing means and debarking means around the tree to remove all of the limbs and bark.

6. Apparatus as defined in claim 5 wherein said delimbing means includes a vertically extending chain saw, a horizontally rotatable arm for supporting said chain saw, and means for urging said arm inwardly towards the center of said rotor to cut the limbs off close to the tree trunk as the apparatus progresses up the tree and the tree trunk becomes smaller in diameter.

7. Apparatus as defined in claim 6 wherein said means for rotating said rotor includes an endless drive member, means for directing said member around a circumferential portion of said rotor, and means for driving said member so that the rotation of said rotor can slow down when said delimbing chain saw encounters a limb requiring additional time to remove.

8. Apparatus as defined in claim 5 wherein said debarking means includes an endless chain having a plurality of rasping teeth mounted thereon, means supporting said chain for travel generally in a horizontal plane, and means connected to said supporting means for urging said chain and said teeth inwardly toward the tree trunk to remove a bank of bark from the tree as said chain revolves around the tree with said rotor.

9. Apparatus as defined in claim 1 wherein said converting means includes an endless chain carrying a plurality of chipping knives, means supporting said chain for travel generally in a horizontal plane, means for urging said supporting means inwardly towards the tree, and said knives each including a cutting edge which extends in a plane generally parallel to the grain of the tree for producing chips having long fibers and for minimizing the power required for driving said chain.

10. Apparatus as defined in claim 9 wherein said collecting means for the chips includes a hood positioned above said chain, and duct means connected to said hood for providing a suction within said hood to collect and transport the chips to a receiving chamber.

11. Apparatus as defined in claim 10 wherein each said chipping knife is troughlike in configuration, and comprising means connecting each said knife to said chain so that each said knife is disposed at an inclined angle relative to the centerline of the tree trunk for splitting a band of chips from the top portion of the tree trunk and directing the chips upwardly into said hood and out of the path of said chain.

12. A method for converting the trunk of a standing tree directly into chips suitable for making paper, chipboard or other products, comprising the steps of: progressively delimbing the tree from the bottom portion of the tree trunk towards the top portion, topping the tree trunk at a predetermined elevation, progressively debarking the tree from the top portion of the tree trunk towards the bottom portion, progressively converting the tree trunk into chips from the top portion towards the bottom portion after the bark is removed, collecting the chips as they are formed, and controlling said delimbing, topping, debarking and converting operations in accordance with a predetermined sequence.

13. A method as defined in claim 12 wherein said debarking operation is performed simultaneously with said converting operation and at an elevation on the tree trunk slightly below the elevation of the chipping operation.

14. A method as defined in claim 12 wherein said step of collecting the chips includes sucking the chips as they are formed into a conduit having a partial vacuum applied thereto so that the chips can be conveniently transported to a receiving bin or the like.

15. A method as defined in claim 12 wherein the step of converting the tree trunk into chips includes splitting of the chips from the standing tree trunk with knives having cutting edges extending in corresponding planes substantially parallel to the grain of the tree trunk for producing chips having long fibers.

16. A method for converting a standing tree directly into chips, comprising the steps of progressively delimbing the tree, progressively converting the tree trunk into chips from the top portion towards the bottom portion, collecting the chips as they are formed, and conveying the chips downwardly to a receiving chamber.

17. A method as defined in claim 16 including the step of progressively debarking the tree simultaneously with said converting operation and at an elevation on the tree trunk below the elevation of the chipping operation.

18. A method as defined in claim 16 wherein said step of conveying the chips includes directing the chips as they are formed through a flexible tubular conduit.

19. Apparatus for converting a standing tree directly into small chips, comprising a frame adapted to receive the tree, means for moving said frame vertically along the tree, means carried by said frame for progressively delimbing the tree, means carried by said frame for progressively converting the tree trunk into chips as the frame moves down the tree, means for collecting the chips as they are formed by said chipping means, and control means for operating said moving means, delimbing means and converting means.

20. Apparatus as defined in claim 19 including means carried by said frame for progressively debarking the tree trunk.

21. Apparatus for converting a standing tree directly into small chips, comprising a frame adapted to receive the tree, means for moving said frame vertically along the tree, means carried by said frame for progressively converting the tree trunk into chips as the frame moves down the tree, means for collecting the chips as they are formed by said chipping means, means for conveying the chips downwardly to a receiving area, and control means for operating said moving means and said converting means.